Dec. 26, 1933.  W. J. McKITRICK  1,941,042
SEAL
Filed June 17, 1933
Fig I
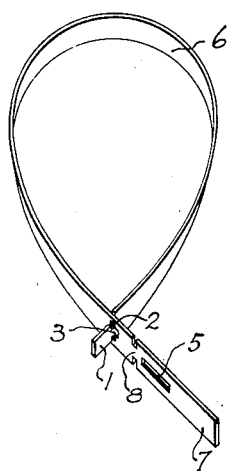
Fig II
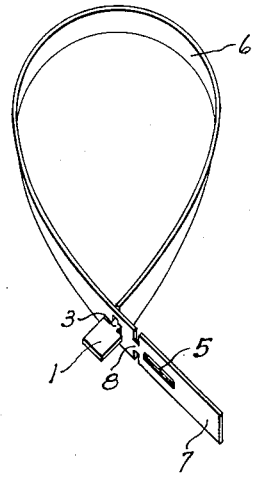
Fig III
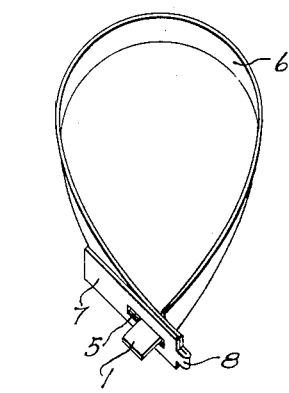
Fig IV
William J. McKitrick INVENTOR
By L. Donald Myers
ATTORNEY

UNITED STATES PATENT OFFICE 1,941,042

SEAL

William J. McKitrick, Lawrence, Kans., assignor of one-half to Edward McKitrick, Lawrence, Kans.

Application June 17, 1933. Serial No. 676,390

2 Claims. (Cl. 292—315)

This invention relates to new and useful improvements in seals.

The primary object of the invention is to provide a seal which is capable of being employed for preventing unauthorized or undetected access to containers, freight cars, or the like.

A further object of the invention is to provide a seal which is capable of being closed or locked to prevent destruction without being detected.

A further object of the invention is to provide a seal which may be closed or locked without necessitating the use of a fusible material or without requiring the use of any special tools.

Other objects and advantages of the invention will be apparent during the course of the following description:

In the accompanying drawing forming a part of this specification and in which like numerals are employed to designate like parts throughout the same, Fig. 1 is a perspective view of the seal before being closed or locked, and Figs. 2 to 4, inclusive, disclose perspective views of the seal during three different stages of closing or locking the same.

The seal is formed in one piece from a strip of readily bendable metal which includes the main body portion 6 of elongated formation. At one end of this body portion there is provided a head 1 of less width than the body portion and connected thereto by a relatively narrow neck 3 formed by oppositely notching the edge portions of the tongue.

Spaced inwardly from the opposite end 7 of the body portion is a transverse slot 2 which is of substantially T shape in plan view. Outwardly of the slot 2, the portion 6 is provided with opposed notches 4 arranged to form a reduced neck 8. Extending longitudinally of the end portion 7 and arranged outwardly of the neck 8 is an elongated slot 5. It will be noted that the slots 2 and 5 are arranged at right angles with respect to each other.

Figs. 2 to 4 inclusive clearly illustrate the three steps necessary to close or lock the seal. In Fig. 2 the head 1 is illustrated as having been threaded through or inserted in the transversely extending head portion of the T slot 2. To prevent withdrawal of the head 1 from the slot 2, the said head is twisted about the axis of the neck 3, as clearly illustrated in Fig. 3, so that the head 1 is arranged on a plane at right angles to the plane of the adjacent portion of the body 6. It further will be noted that the head 1 now extends transversely of the main portion or top of the T slot 2. For the purpose of preventing the head 1 from being twisted back into its original position, the end portion 7 of the seal is bent upon the body portion of the seal and with the bend or bite occurring within the neck 8. The longitudinally extending slot 5 in the end 7 is properly positioned so as to receive the head 1 in its twisted position. With the end 7 folded upon the body portion 6 of the seal, and with the head 1 received within the slot 5, the said head cannot be twisted back into its original position. Should any unauthorized person attempt to tamper with the seal in an endeavor to open the same, it will be necessary for that party to bend the end 7 outwardly to free the head 1. This reverse bending of the end 7 will cause the metal to snap or break at the neck 8. It will be apparent, therefore, that the seal cannot be opened without being detected.

It is to be understood that the form of this invention herewith shown and described is to be taken as a preferred example of the same, and that various changes in the shape, size, and arrangement of parts will be resorted to without departing from the spirit of the invention or the scope of the subjoined claims.

Having thus described the invention, I claim:

1. A seal comprising an elongated metallic body portion, a head connected to one end of the body portion by a reduced neck, said body portion having a pair of spaced, right angularly arranged slots formed therein adjacent its remaining end, and a reduced neck formed between said spaced slots, said head being adapted to be inserted in one of said slots and then twisted about its axis so as to be insertable in the second slot.

2. A seal comprising a body portion, a head connected to one end of the body portion, said body portion having a pair of spaced slots formed therein at a point spaced from said head and angularly arranged with respect to each other, said head being adapted to be inserted in one of said slots and then twisted about its axis and relative to the adjacent body portion so as to be received in the second slot when a portion of the body is bent at a point occurring between said slots.

WILLIAM J. McKITRICK.